(12) United States Patent
Chen (10) Patent No.: US 11,768,354 B2
(45) Date of Patent: Sep. 26, 2023

(54) OPTICAL LENS

(71) Applicant: ABILITY ENTERPRISE CO., LTD., New Taipei (TW)

(72) Inventor: Chia-Hung Chen, New Taipei (TW)

(73) Assignee: ABILITY ENTERPRISE CO., LTD, New Taipei (TW)

( * ) Notice: Subject to any disclaimer, the term of this patent is extended or adjusted under 35 U.S.C. 154(b) by 228 days.

(21) Appl. No.: 16/683,826

(22) Filed: Nov. 14, 2019

(65) Prior Publication Data
US 2020/0201001 A1    Jun. 25, 2020

(30) Foreign Application Priority Data

Dec. 21, 2018   (TW) .................................. 107146528

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC ... G02B 9/60; G02B 9/62; G02B 9/64; G02B 13/0045; G02B 13/005; G02B 13/04
USPC ......... 359/713–714, 749–753, 763, 764, 770
See application file for complete search history.

(56) References Cited

U.S. PATENT DOCUMENTS

| | | | | |
|---|---|---|---|---|
| 5,777,797 A * | 7/1998 | Miyano | ................ | G02B 23/243 359/660 |
| 8,456,765 B1 * | 6/2013 | Yin | ........................ | G02B 15/10 359/770 |
| 2005/0219715 A1 * | 10/2005 | Kimura | .................. | G02B 13/06 359/749 |
| 2011/0316969 A1 | 12/2011 | Hsieh et al. | | |
| 2012/0212832 A1 * | 8/2012 | Mizusawa | .......... | G02B 17/0856 359/682 |
| 2015/0042773 A1 * | 2/2015 | Uzawa | ............... | A61B 1/00096 359/749 |

(Continued)

FOREIGN PATENT DOCUMENTS

| | | |
|---|---|---|
| CN | 101339288 A | 1/2009 |
| CN | 103336351 A | 10/2013 |

(Continued)

OTHER PUBLICATIONS

Communication corresponding to Chinese Application No. 201811591547.8 and issued by the China National Intellectual Property Administration dated Jun. 30, 2021, 8 pages.

(Continued)

*Primary Examiner* — Darryl J Collins
(74) *Attorney, Agent, or Firm* — Innovation Counsel LLP (57) ABSTRACT

An optical lens is provided. The optical lens includes, in order from an object side to an image-forming side, a first lens having refractive power, a second lens having refractive power, a third lens having positive refractive power, a fourth lens having positive refractive power and a fifth lens having refractive power. The object-side surface of the first lens is a concave surface or a flat surface. The overall optical effect of the first lens and the second lens is negative refractive power. The refractive rate on the object-side surface and/or the image-side surface of the fifth lens from the center point in a radial direction away from the optical axis changes in the same tendency.

5 Claims, 5 Drawing Sheets

(56) References Cited

U.S. PATENT DOCUMENTS

| | | | |
|---|---|---|---|
| 2015/0116848 A1* | 4/2015 | Yamada | G02B 9/64 |
| | | | 359/749 |
| 2016/0377839 A1* | 12/2016 | Chen | G02B 13/0045 |
| | | | 359/708 |
| 2017/0102520 A1 | 4/2017 | Chen et al. | |
| 2017/0131519 A1* | 5/2017 | Hsieh | G02B 9/60 |
| 2018/0088301 A1* | 3/2018 | Otomo | G02B 13/18 |
| 2018/0106987 A1* | 4/2018 | Lin | G02B 9/62 |
| 2018/0341085 A1* | 11/2018 | Bone | G02B 13/0045 |
| 2019/0142249 A1* | 5/2019 | Koyama | G02B 9/00 |
| | | | 600/160 |

FOREIGN PATENT DOCUMENTS

| | | |
|---|---|---|
| CN | 107179599 A | 9/2017 |
| JP | H08234102 A | 9/1996 |

OTHER PUBLICATIONS

Taiwan Office Action corresponding to Application No. 107146528 dated Aug. 26, 2022, 10 pages.

* cited by examiner

| Lens | Surface number | Radius of curvature (mm) | Thickness (mm) | Refractive index | Abbe number |
|---|---|---|---|---|---|
| L1 | S1 | -35 | 0.4 | 1.64 | 56 |
|  | S2 | 3 | 0.4 |  |  |
| L2 | S3 | 3 | 0.3 | 1.55 | 56 |
|  | S4 | 2.8 | 0.1 |  |  |
|  | St | ∞ | 0.03 |  |  |
| L3 | S5 | -80 | 1.7 | 2 | 30 |
|  | S6 | -2.5 | 0.06 |  |  |
| L4 | S7 | 9 | 1 | 1.55 | 56 |
|  | S8 | -2.2 | 0.6 |  |  |
| L5 | S9 | -0.6 | 0.5 | 1.55 | 56 |
|  | S10 | -0.8 | 0.2 |  |  |
| Ft | S11 | ∞ | 0.3 | 1.5 | 64 |
|  | S12 | ∞ | 0.7 |  |  |
| C | S13 | ∞ | 0.4 | 1.5 | 64 |
|  | S14 | ∞ | 0.12 |  |  |
|  | I | ∞ |  |  |  |

FIG. 3A

| Surface number | S3 | S4 | S7 | S8 | S9 | S10 |
|---|---|---|---|---|---|---|
| K | -45.65 | 15.57 | 0.59 | -0.17 | -1.04 | -1.02 |
| A2 | 0 | 0 | 0 | 0 | 0 | 0 |
| A4 | 0.1153 | -0.0955 | 0.0018 | 0.0111 | 0.1959 | 0.1341 |
| A6 | -0.3716 | -0.1133 | -0.0202 | -0.0482 | 0.0149 | 0.0340 |
| A8 | 0.4243 | -0.6369 | 0.0106 | 0.0393 | -0.0159 | -0.0131 |
| A10 | -0.4100 | 2.2272 | 0.0012 | -0.0055 | 0.0026 | -0.0039 |
| A12 | 0.2220 | -4.0789 | -0.0012 | -0.0004 | -0.0011 | 0.0013 |

FIG. 3B

| Lens | Surface number | Radius of curvature (mm) | Thickness (mm) | Refractive index | Abbe number |
|---|---|---|---|---|---|
| L1 | S1 | ∞ | 0.4 | 1.64 | 56 |
|  | S2 | 3 | 0.15 |  |  |
| L2 | S3 | 2.75 | 0.35 | 1.55 | 56 |
|  | S4 | 2.8 | 0.1 |  |  |
|  | St | ∞ | 0.03 |  |  |
| L3 | S5 | ∞ | 1.8 | 2 | 30 |
|  | S6 | -2.5 | 0.05 |  |  |
| L4 | S7 | 14.5 | 1 | 1.55 | 56 |
|  | S8 | -2.5 | 0.6 |  |  |
| L5 | S9 | -0.6 | 0.55 | 1.55 | 56 |
|  | S10 | -0.9 | 0.2 |  |  |
| Ft | S11 | ∞ | 0.3 | 1.5 | 64 |
|  | S12 | ∞ | 0.9 |  |  |
| C | S13 | ∞ | 0.4 | 1.5 | 64 |
|  | S14 | ∞ | 0.12 |  |  |
|  | I | ∞ |  |  |  |

FIG. 4A

| Surface number | S3 | S4 | S7 | S8 | S9 | S10 |
|---|---|---|---|---|---|---|
| K | -35 | 14 | 40 | 0 | -1 | -1 |
| A2 | 0 | 0 | 0 | 0 | 0 | 0 |
| A4 | 0.1218 | -0.0739 | 0.0073 | 0.0235 | 0.1700 | 0.1308 |
| A6 | -0.3418 | -0.0869 | -0.0248 | -0.0721 | 0.0020 | 0.0360 |
| A8 | 0.3487 | -1.0074 | 0.0197 | 0.0689 | -0.0105 | -0.0145 |
| A10 | -0.3395 | 3.4355 | -0.0038 | -0.0209 | 0.0022 | -0.0046 |
| A12 | 0.1883 | -4.6762 | -0.0026 | -0.0007 | -0.0034 | 0.0022 |

FIG. 4B

|  | OL1 | OL2 |
|---|---|---|
| f (mm) | 2.1 | 2.5 |
| TTL (mm) | 7 | 7 |
| Fno | 2 | 2 |
| Y' (mm) | 2.3 | 2.3 |
| FOV (°) | 140 | 110 |
| TTL/f | 3.33 | 2.8 |
| (Fno*TTL)/(FOV*Y') | 0.043 | 0.055 |
| f/Y' | 0.91 | 1.09 |
| R7 (mm) | 9 | 14.5 |
| R8 (mm) | -2.2 | -2.5 |
| R9 (mm) | -0.6 | -0.6 |
| R10 (mm) | -0.8 | -0.9 |
| (R7-R8)/(R7+R8) | 1.647 | 1.417 |
| (R9-R10)/(R9+R10) | -0.143 | -0.2 |

FIG. 5

OPTICAL LENS

This application claims the benefit of Taiwan application Serial No. 107146528, filed Dec. 21, 2018, the subject matter of which is incorporated herein by reference.

BACKGROUND OF THE INVENTION

Field of the Invention

The invention relates in general to an optical lens, and more particularly to an optical lens having a smaller size and better imaging quality.

Description of the Related Art

Over recent years, as the application field of imaging device has become wider and wider, the demand for small-sized optical lens is ever increasing. Additionally, the market requirement for the imaging quality of optical lens is getting higher and higher. To enhance the market competitiveness, miniaturization, high definition and low cost have always been important goals to achieve for product developers.

Therefore, it has become a prominent task for the industries to provide a new type of optical lens. Under the premise that manufacturing cost is reduced, the optical lens can have smaller size and better imaging quality.

SUMMARY OF THE INVENTION

The invention is directed to an optical lens. Under the premise that manufacturing cost is reduced, the optical lens can have a smaller size and better imaging quality.

According to an embodiment of the present invention, an optical lens is provided. The optical lens includes, in order from an object side to an image-forming side, a first lens having refractive power, a second lens having refractive power, a third lens having positive refractive power, a fourth lens having positive refractive power, and a fifth lens having negative refractive power. The object-side surface of the first lens is one of a concave surface and a flat surface. The overall optical effect of the first lens and the second lens is negative refractive power.

According to another embodiment of the present invention, an optical lens is provided. The optical lens has an optical axis and includes, in order from an object side to an image-forming side, a first lens having negative refractive power, a second lens, a third lens having positive refractive power, a fourth lens having positive refractive power and a fifth lens. The second lens is a convex-concave lens. The fifth lens has an object-side surface and an image-side surface. The refractive rate on the object-side surface and/or the image-side surface of the fifth lens from the center point in a radial direction away from the optical axis changes in the same tendency.

According to an alternate embodiment of the present invention, an optical lens is provided. The optical lens has an optical axis and includes, in order from an object side to an image-forming side, a first lens having negative refractive power, a second lens having refractive power, a third lens having positive refractive power, a fourth lens having positive refractive power and a fifth lens. The overall optical effect of the first lens and the second lens is negative refractive power. The refractive rate on the object-side surface and/or the image-side surface of the fifth lens along the center point in a radial direction away from the optical axis changes in the same tendency.

The above and other aspects of the invention will become better understood with regard to the following detailed description of the preferred but non-limiting embodiment(s). The following description is made with reference to the accompanying drawings.

DETAILED DESCRIPTION OF THE INVENTION

Each embodiment of the present invention is described below with reference to accompanying drawings. The present invention can further be widely used in other embodiments. Any simple substitutions, modifications or equivalent changes are still within the scope of protection of the present invention, but the appended claims shall prevail. In the specification, many specific details are provided for the readers to gain a more thorough understanding of the present invention. However, the present invention still can be implemented in the absence of some or all of the said specific details. Besides, descriptions of generally known procedures or elements are not included in the details to avoid causing unnecessary limitations to the scope of protection of the present invention. Designations common to the accompanying drawings are used to indicate identical or similar elements. It should be noted that the accompanying drawings are schematically shown for exemplary purpose only, not for representing actual sizes, scales or quantities of elements unless otherwise stated.

Figure 1:
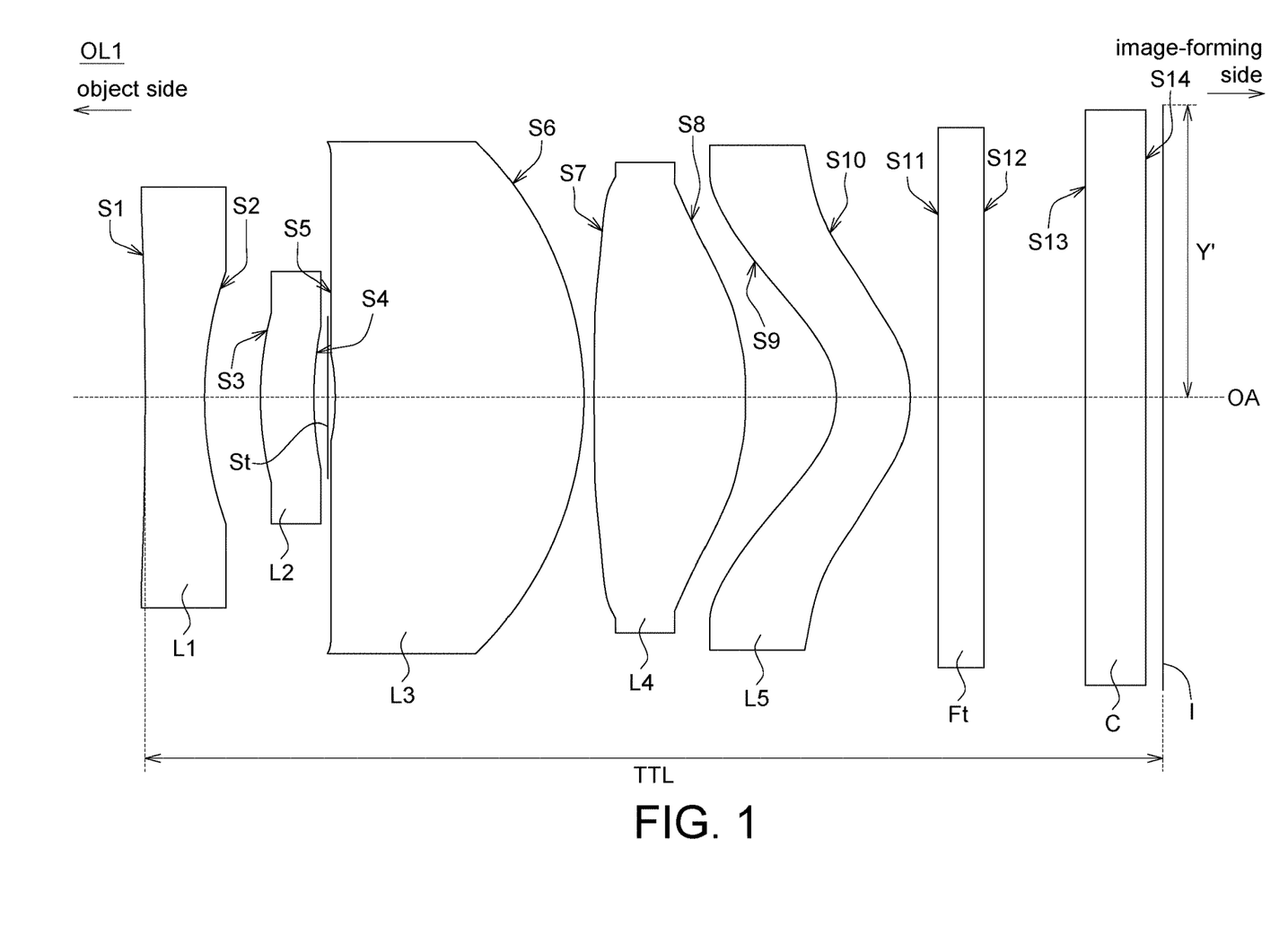
FIG. 1 is a schematic diagram of an optical lens according to an embodiment of the present invention.
Figure 2:
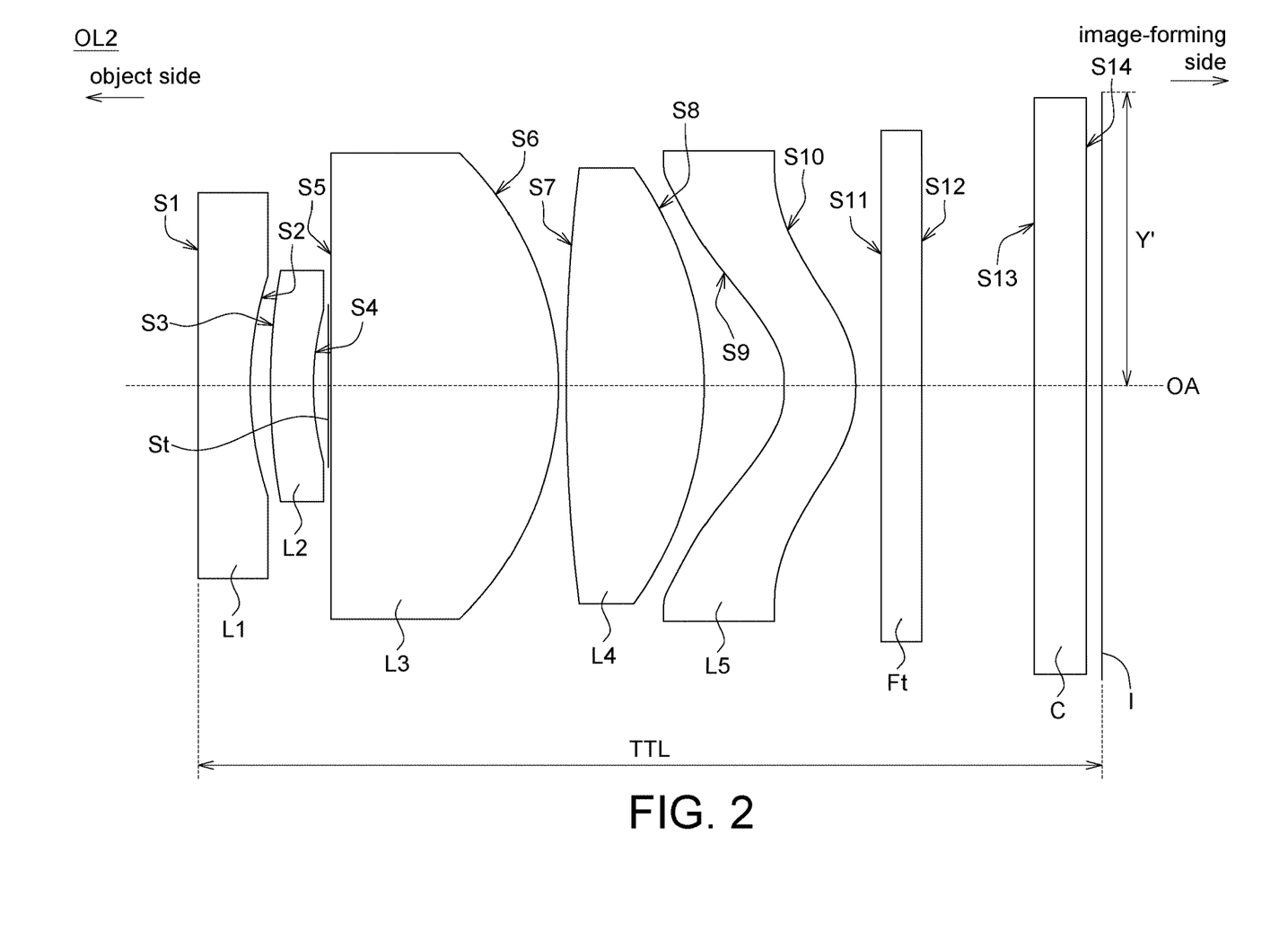
FIG. 2 is a schematic diagram of an optical lens according to another embodiment of the present invention.

FIG. 1 is a schematic diagram of an optical lens OL1 according to an embodiment of the present invention. FIG. 2 is a schematic diagram of an optical lens OL2 according to another embodiment of the present invention. To highlight the features of the embodiment, only the structures relevant to the embodiment of the present invention are illustrated, and remaining structures are omitted. The optical lenses OL1 and OL2 may be used in a device having image projection or image capture function. The said device includes but is not limited to handheld computer system, handheld communication system, aerial camera, sports camera lens, car camera lens, surveillance system, digital camera, digital camera, or projector.

Refer to FIG. 1 and FIG. 2. The optical lenses OL1 and OL2 includes, in order from an object side to an image-forming side, a first lens L1, a second lens L2, a third lens L3, a fourth lens L4 and a fifth lens L5. The first lens L1, the second lens L2, the third lens L3, the fourth lens L4 and the fifth lens L5 may be arranged along an optical axis OA.

In some embodiments, the overall optical effect of the first lens L1 and the second lens L2 is negative refractive power. In some other embodiments, the overall optical effect of the third lens L3, the fourth lens L4 and the fifth lens L5 is positive refractive power. The first lens L1 and the second lens L2 may be defined as a first lens group. The third lens L3, the fourth lens L4 and the fifth lens L5 may be defined as a second lens group. However, the above exemplifications are not for limiting the present invention.

In some embodiments, the first lens L1 and the second lens L2 respectively have refractive power, such as negative refractive power or positive refractive power; the third lens L3 has positive refractive power; the fourth lens L4 has positive refractive power; the fifth lens L5 has refractive power, such as positive refractive power or negative refractive power.

In some practical embodiments, the first lens L1 has negative refractive power. In some other practical embodiments, the second lens L2 and the fifth lens L5 both have negative refractive power. In another practical embodiment, the second lens L2 has positive refractive power; the fifth lens L5 has negative refractive power.

In some embodiments, a distance from the object-side surface S1 of the first lens L1 to an imaging plane I is TTL, a focal length of the optical lenses OL1, OL2 is f, and the optical lenses OL1, OL2 may satisfy at least one of the following conditions: 2≤TTL/f, 2.5≤TTL/f, 2.8≤TTL/f, TTL/f≤3.33, TTL/f≤3.5 and TTL/f≤4.

In some embodiments, an image height (half image sensor height) of the optical lenses OL1, OL2 is Y', and the optical lenses OL1, OL2 may satisfy at least one of the following conditions: 0.5≤f/Y', 0.7≤f/Y', 0.91≤f/Y', f/Y'≤1.09a, f/Y'≤1.3 and f/Y'≤1.5.

In some embodiments, a field of view of the optical lenses OL1, OL2 is FOV, and the optical lenses OL1, OL2 may satisfy at least one of the following conditions: 90°≤FOV, 100°≤FOV, FOV≤150°, FOV≤175° and FOV≤1800.

In some embodiments, an aperture of the optical lenses OL1, OL2 is Fno, and the optical lenses OL1, OL2 may satisfy at least one of the following conditions: 0<(Fno×TTL)/(FOV×Y'), 0.03≤(Fno×TTL)/(FOV×Y'), 0.04≤(Fno×TTL)/(FOV×Y'), (Fno×TTL)/(FOV×Y')≤0.06, (Fno×TTL)/(FOV×Y')≤0.1, (Fno×TTL)/(FOV×Y')≤0.2 and (Fno×TTL)/(FOV×Y')≤0.3.

In some embodiments, a radius of curvature of the object-side surface S7 of the fourth lens L4 is R7, a radius of curvature of the image-side surface S8 is R8, and the optical lenses OL1 and OL2 may satisfy at least one of the following conditions: 1≤|(R7−R8)/(R7+R8)|, 1.4≤|(R7−R8)/(R7+R8)|, |(R7−R8)/(R7+R8)|≤1.65 and |(R7−R8)/(R7+R8)|≤2.

In some embodiments, the optical lenses OL1 and OL2 may further satisfy at least one of the following conditions: 1≤(R7−R8)/(R7+R8), 1.4≤(R7−R8)/(R7+R8), (R7−R8)/(R7+R8)≤1.65 and (R7−R8)/(R7+R8)≤2.

In some embodiments, a radius of curvature of the object-side surface S9 of the fifth lens L5 R9, a radius of curvature of the image-side surface S10 is R10, and the optical lenses OL1 and OL2 may satisfy at least one of the following conditions: 0≤|(R9−R10)/(R9+R10)|, 0.1≤|(R9−R10)/(R9+R10)|, 0.14≤|(R9−R10)/(R9+R10)|, |(R9−R10)/(R9+R10)|≤0.2, |(R9−R10)/(R9+R10)|≤0.6 and |(R9−R10)/(R9+R10)|≤1.

In some embodiments, the optical lenses OL1 and OL2 may further satisfy at least one of the following conditions: −1≤(R9−R10)/(R9+R10), −0.6≤(R9−R10)/(R9+R10), −0.2≤(R9−R10)/(R9+R10), (R9−R10)/(R9+R10)≤−0.14, (R9−R10)/(R9+R10)≤−0.1 and (R9−R10)/(R9+R10)≤0.

In some embodiments, a refractive index of the first lens L1 is N1 and an Abbe number of the first lens L2 is V1, a refractive index of the second lens L2 is N2 and an Abbe number of the second lens L2 is V2, a refractive index of the third lens L3 is N3 and an Abbe number of the third lens L3 is V3, a refractive index of the fourth lens L4 is N4 and an Abbe number of the fourth lens L4 is V4, a refractive index of the fifth lens L5 is N5 and an Abbe number of the fifth lens L5 is V5, and the optical lenses OL1 and OL2 may satisfy at least one of the following conditions: N3>N1, N1>N2, N1>N4, N1>N5, V1>V3, V2>V3, V4>V3 and V5>V3.

In some embodiments, the optical lenses OL1 and OL2 may satisfy at least one of the following conditions: N3−N1≥0.05, N1−N2≥0.05, N1−N4≥0.05, N1−N5≥0.05, V1−V3≥5, V2−V3≥5, V4−V3≥5 and V5−V3≥5.

In some practical embodiments, the optical lenses OL1 and OL2 may satisfy at least one of the following conditions: N2=N4, N2=N5, N4=N5, V2=V4, V2=V5 and V4=V5.

In some embodiments, the first lens L1, the second lens L2, the third lens L3, the fourth lens L4 and the fifth lens L5 may respectively be spherical lenses, freeform lenses or aspherical lenses.

Specifically, each freeform lens has at least one freeform surface, that is, the object-side surface and/or the image-side surface of the freeform lens is a freeform surface; each aspheric lens has at least one aspheric surface, that is, the object-side surface and/or the image-side surface of the aspheric lens is an aspheric surface. Each aspheric surface satisfies the following mathematical formula:

$$Z = \left[\frac{(C*Y^2)}{1+\sqrt{1-(K+1)C^2Y^2}}\right] + \sum (A_i * Y^i)$$

Wherein, Z denotes a coordinate value in the optical axis OA direction; the light transmission direction is defined as a positive direction; A2, A4, A6, A8, A10 and A12 are aspheric coefficients; K is a quadratic constant; C=1/R, R denotes a radius of curvature; Y denotes a coordinate value orthogonal to the optical axis OA direction; the direction away from the optical axis OA is defined as a positive direction. Besides, the value of each parameter or coefficient in the aspheric surface formula may be respectively set to determine the focal length of each position point on the aspheric surface.

In an embodiment, at least one of the first lens L1 and the third lens L3 may be realized by a spherical lens. In another embodiment, at least one of the second lens L2, the fourth lens L4 and the fifth lens L5 may be realized by an aspheric lens. In a practical embodiment, both the first lens L1 and the third lens L3 may be realized by a spherical lens; each of the second lens L2, the fourth lens L4 and the fifth lens L5 may be realized by an aspheric lens.

In some embodiments, the first lens L1, the second lens L2, the third lens L3, the fourth lens L4 and the fifth lens L5 may be realized by glass lenses or plastic lenses. The material of plastic lenses may include but is not limited to polycarbonate, cycloolefin copolymers (such as APEL), and polyester resins (such as OKP4 or OKP4HT). Or, plastic lenses may be formed of a mixture and/or a compound including at least one of the polycarbonate, cycloolefin copolymers, and polyester resins.

In some embodiments, at least one of the first lens L1 and the third lens L3 may be realized by a glass lens. In some other embodiments, at least one of the second lens L2, the fourth lens L4 and the fifth lens L5 may be realized by a plastic lens. In a practical embodiment, both the first lens L1 and the third lens L3 are realized by glass lenses; all of the second lens L2, the fourth lens L4 and the fifth lens L5 may be realized by plastic lenses. In some practical embodiments, the second lens L2, the fourth lens L4 and the fifth lens L5 may be formed of the same material.

Refer to FIG. 1 and FIG. 2. In some embodiments, the object-side surface S1 of the first lens L1 may be a flat surface or a concave surface, which is recessed towards the image-forming side and has an infinite refractive rate or a negative refractive rate; the image-side surface S2 of the first lens L1 may be a concave surface, which is recessed towards the object side and has a positive refractive rate. The first lens L1 may be realized by a lens having negative refractive power. For example, the first lens L1 may include but is not limited to at least one of biconcave lens or flat-concave lens, glass lens or plastic lens, having negative refractive power, and spherical lens or aspheric lens, or a combination thereof.

The object-side surface S3 of the second lens L2 may be a convex surface, which is protruded towards the object side and has a positive refractive rate. The image-side surface S4 may be a concave surface, which is recessed towards the object side and has a positive refractive rate. The second lens L2 may be realized by a lens having refractive power. For example, the second lens L2 may include but is not limited to a convex-concave lens, having negative refractive power or positive refractive power, a glass lens or a plastic lens, and any or a combination of a spherical lens and an aspheric lens.

In some embodiments, at least one slope of a tangent of any two points of the object-side surface S3 may be positive, wherein the two points of the object-side surface S3 are adopted from the center point of the object-side surface S3 to an edge of the second lens L2 in the first direction X; at least one slope of a tangent of any two points of the object-side surface S3 may be negative, wherein the two points of the object-side surface S3 are adopted from the center point of the object-side surface S3 against the first direction X (that is, along the −X direction). And/or, at least one slope of a tangent of any two points of the image-side surface S4 may be positive, wherein the two points of the image-side surface S4 are adopted from the center point of the image-side surface S4 in the first direction X; at least one slope of tangent of any two points of the image-side surface S4 may be negative, wherein the two points of the image-side surface S4 are adopted from the center point of the image-side surface S4 against the first direction X (that is, along the −X direction). In some embodiments, at least one of the object-side surface S3 and the image-side surface S4 of the second lens L2 may be an aspheric surface without an inflection point. In some specifically embodiments, the refractive rate on the object-side surface S3 from the center point in a radial direction away from the optical axis OA changes in the same tendency. That is, slopes of tangents of any two points from the center point of the object-side surface S3 in the first direction X may always be positive or from the center point of the object-side surface S3 against the first direction X may always be negative. And, slopes of tangents of any two points from the center point of the image-side surface S4 in the first direction X may always be positive or from the center point of the image-side surface S4 against the first direction X may always be negative.

The object-side surface S5 of the third lens L3 may be a flat surface or a concave surface, which is recessed towards the image-forming side and has an infinite refractive rate or a negative refractive rate. The image-side surface S6 may be a convex surface, which is protruded towards the image-forming side and has a negative refractive rate. The third lens L3 may be realized by a lens having positive refractive power such as but is not limited to a concave-convex lens or a flat-concave lens, having positive refractive power, a glass lens or a plastic lens, and any or a combination of a spherical lens and an aspheric lens.

The object-side surface S7 of the fourth lens L4 may be a convex surface which is protruded towards the object side, and has a positive refractive rate. The image-side surface S8 may be a convex surface which is protruded towards the image-forming side, and has a negative refractive rate. The fourth lens L4 may be realized by a lens having positive refractive power such as but is not limited to a biconvex lens, having positive refractive power, a glass lens or a plastic lens, and any or a combination of a spherical lens and an aspheric lens.

The object-side surface S9 of the fifth lens L5 may be a concave surface which is recessed towards the image-forming side and has a negative refractive rate. The image-side surface S10 may be a convex surface, which is protruded towards the image-forming side and has a negative refractive rate. The fifth lens L5 may be realized by a lens having refractive power such as but is not limited to a concave-convex lens, having negative refractive power or positive refractive power, a glass lens or a plastic lens, and any or a combination of a spherical lens and an aspheric lens.

In some embodiments, at least one slope of tangent of any two points of the object-side surface S9 may be negative, wherein the two points are adopted from the center point of the object-side surface S9 in the first direction X; at least one slope of tangent of any two points of the object-side surface S9 may be positive, wherein the two points are adopted from the center point of the object-side surface S9 against the first direction X. And/or, at least one slope of tangent of any two points of the image-side surface S10 may be negative, wherein the two points are adopted from the center point of the image-side surface S10 in the first direction X; at least one slope of tangent of any two points of the image-side surface S10 may be positive, wherein the two points are adopted from the center point of the image-side surface S10 against the first direction X. In some embodiments, at least one of the object-side surface S9 and the image-side surface S10 of the fifth lens L5 may be an aspheric surface without an inflection point. In some specifically embodiments, the refractive rate on the object-side surface S9 from the center point in a radial direction away from the optical axis OA changes in the same tendency. And/or, similarly, the refractive rate on the image-side surface S10 from the center point in a radial direction away from the optical axis OA changes in the same tendency. That is, slopes of tangents of any two points from the center point of the object-side surface S9 in the first direction X may always be negative or from the center point of the object-side surface S9 against the first direction X may always be positive. And, slopes of tangents of any two points from the center point of the image-side surface S10 in the first direction X may always be negative or from the center point of the image-side surface S10 against the first direction X may always be positive.

In some embodiments, the optical lenses OL1 and OL2 may further include an aperture St. In some other embodiments, an image capturing unit (not illustrated) may further be disposed on the imaging plane I for performing photoelectric conversion onto the light beam passing through the optical lenses OL1 and OL2. The aperture St may be disposed on the object side of the first lens L1, disposed at any gap between any two lenses from the first lens L1 to the fifth lens L5, or disposed between the fifth lens L5 and the imaging plane I. In a practical embodiment, the aperture St is disposed between the first lens L1 and the second lens L2. In another practical embodiment, the aperture St is disposed between the second lens L2 and the third lens L3, but the invention is not limited thereto.

Additionally, the optical lenses OL1 and OL2 may further include a filter Ft and/or a protection sheet C. In some embodiments, the filter Ft may be disposed between the fifth lens L5 and the imaging plane I. In some practical embodiments, the filter Ft may be realized by an IR filter. In some other embodiments, the protection sheet C may be disposed between the filter Ft and the imaging plane I, and the protection sheet C may further have a filter film (not illustrated) formed thereon. In some other embodiments, the optical lenses OL1 and OL2 may include only the protection sheet C, which integrates the functions of protecting the image capturing unit and filtering off infrared light.

Figure 3A:
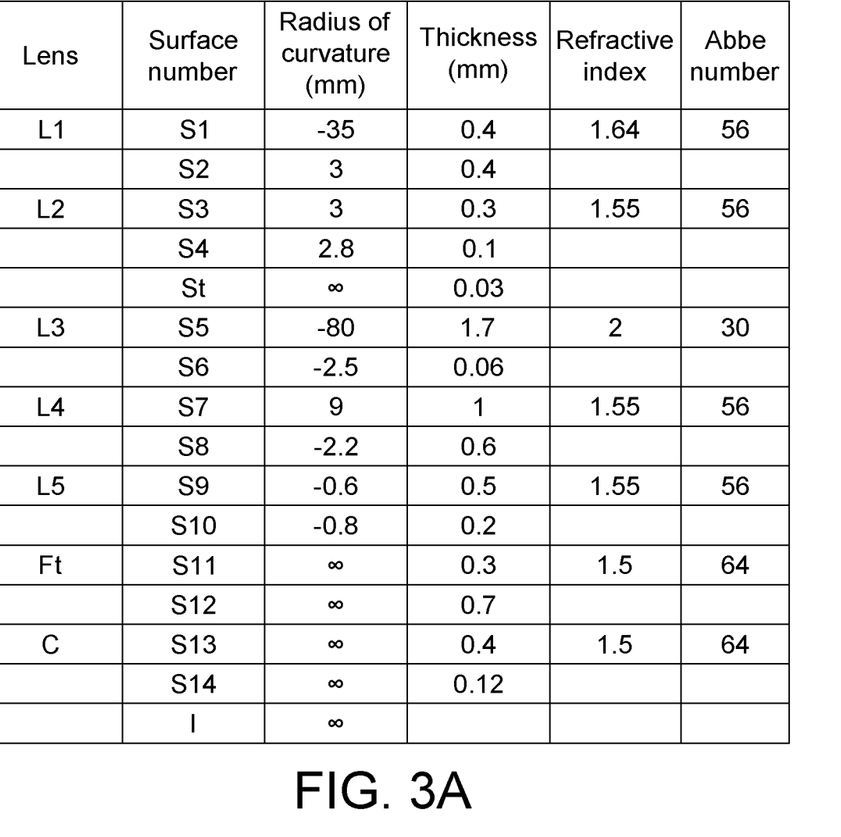
FIG. 3A shows each lens parameter of the optical lens of FIG. 1 according to an embodiment of the present invention.

FIG. 3A shows each lens parameter of the optical lens OL1 of FIG. 1 according to an embodiment of the present invention. The lens parameters include radius of curvature, thickness, refractive index and Abbe number (dispersion coefficient) of each lens. The lens surface number is arranged in order from an object side to an image-forming side. For example, "St" denotes the aperture St; "S1" denotes the object-side surface S1 of the first lens L1; "S2" denotes the image-side surface S2 of the first lens L1 . . . ; "S11" and "S12" respective denote the object-side surface S11 and the image-side surface S12 of the filter Ft; "S13" and "S14" respectively denotes the object-side surface S13 and the image-side surface S14 of the protection sheet C. Besides, "thickness" denotes the distance between the surface and a surface adjacent to the image-forming side. For example, the "thickness" of the object-side surface S1 is the distance between the object-side surface S1 of the first lens L1 and the image-side surface S2 of the first lens L1; the "thickness" of the image-side surface S2 is the distance between the image-side surface S2 of the first lens L1 and the object-side surface S3 of the second lens L2.

Figure 3B:
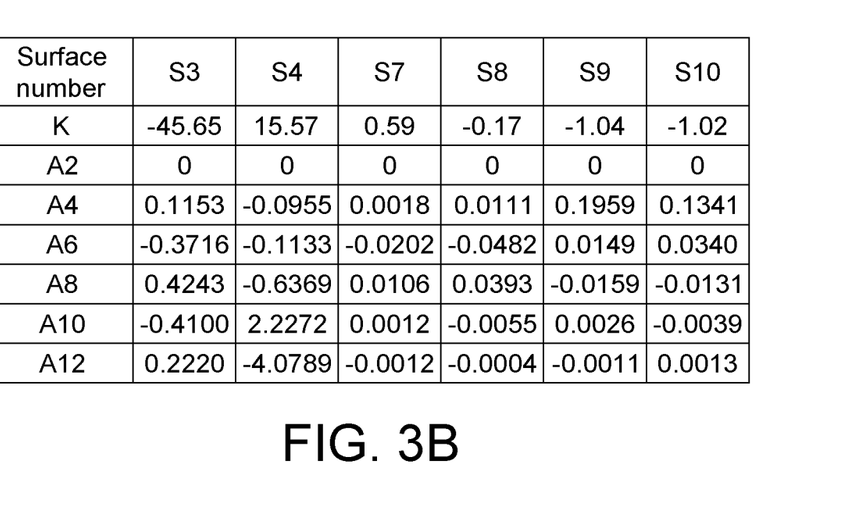
FIG. 3B shows each coefficient of a mathematical formula of aspheric surface for the aspheric lens of the optical lens of FIG. 1 according to an embodiment the present invention.

FIG. 3B shows each coefficient of a mathematical formula of aspheric surface for the aspheric lens of the optical lens OL1 of FIG. 1 according to an embodiment the present invention. If each of the object-side surfaces S3, S7 and S9 and the image-side surfaces S4, S8 and S10 of the second lens L2, the fourth lens L4 and the fifth lens L5 of the optical lens OL1 is an aspheric surface, then each coefficient of the mathematical formula of aspheric surface is as illustrated in FIG. 3B.

Figure 4A:
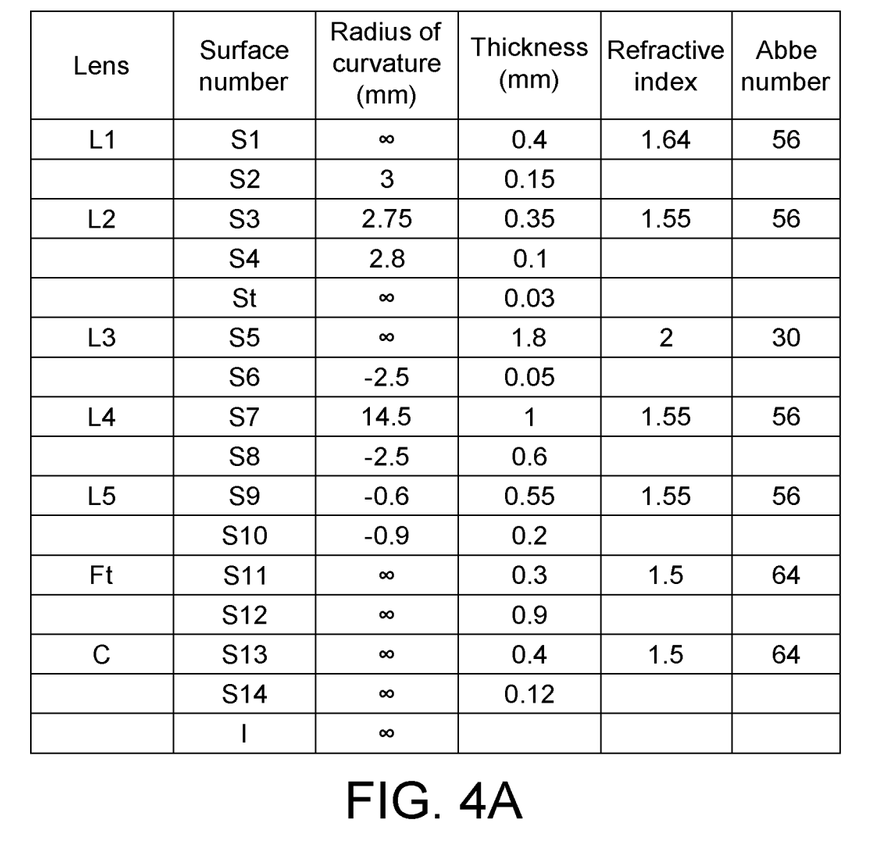
FIG. 4A shows each lens parameter of the optical lens of FIG. 2 according to an embodiment of the present invention.

FIG. 4A shows each lens parameter of the optical lens OL2 of FIG. 2 according to an embodiment of the present invention. The definition and meaning of each parameter listed in FIG. 4A is basically the same as that listed in FIG. 3A.

Figure 4B:
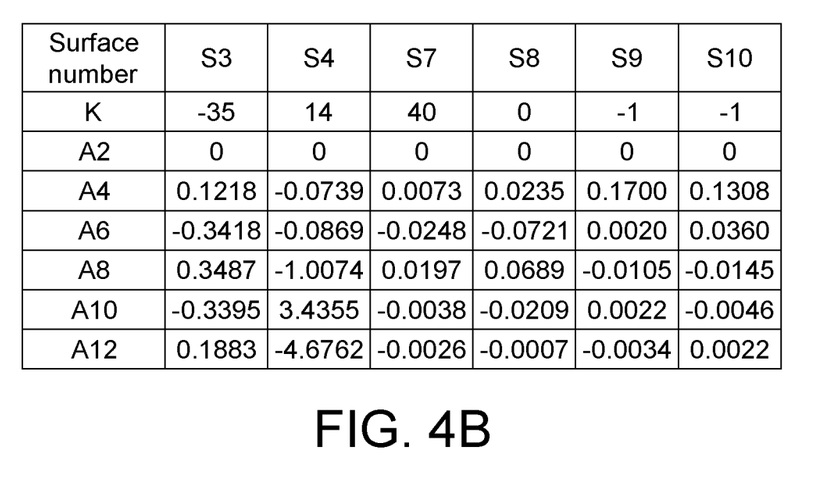
FIG. 4B shows each coefficient of a mathematical formula of aspheric surface for the aspheric lens of the optical lens of FIG. 2 according to an embodiment the present invention.

FIG. 4B shows each coefficient of a mathematical formula of aspheric surface for the aspheric lens of the optical lens OL2 of FIG. 2 according to an embodiment the present invention. If each of the object-side surfaces S3, S7, and S9 and the image-side surfaces S4, S8, and S10 of the second lens L2, the fourth lens L4 and the fifth lens L5 of the optical lens OL2 is an aspheric surface, then each coefficient of the mathematical formula of aspheric surface is as illustrated in FIG. 4B.

Figure 5:
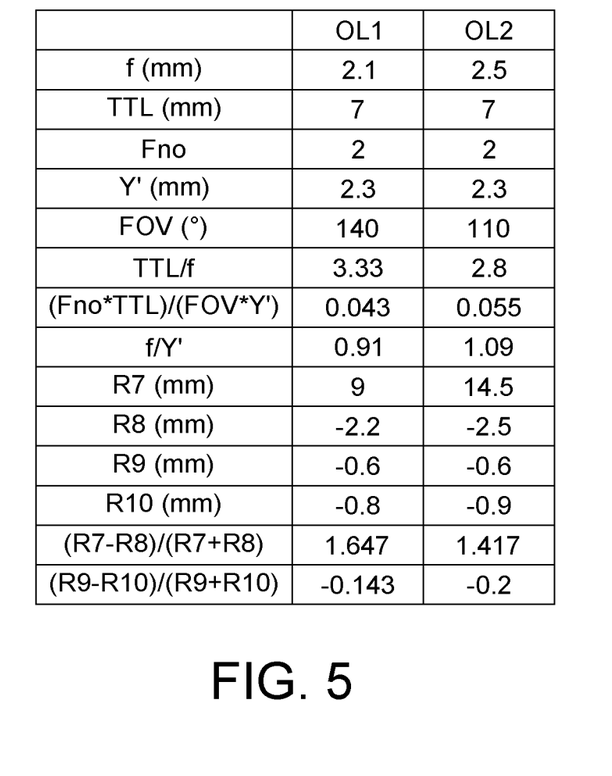
FIG. 5 shows parameter performance of the optical lens of FIG. 3A and FIG. 4A according to an embodiment of the present invention.

FIG. 5 shows parameter performance of the optical lenses OL1 and OL2 of FIG. 3A and FIG. 4A according to an embodiment of the present invention. Parameter performance of the optical lenses OL1 and OL2 include focal length f, aperture value Fno, image height Y', field of view FOV, and radii of curvature R7 to R10 of object-side surfaces S7, S9 and image-side surfaces S8 and S10, and relationships between the above parameters, wherein the object-side surface S1 is separated from the imaging plane I of the first lens L1 by a distance TTL.

Under the premise that the manufacturing cost is reduced, the optical lenses OL1 and OL2 of the above embodiments have a smaller size and better imaging quality.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical lens, in order from an object side to an image-forming side, consisting of:
a first lens having refractive power, an object-side surface of the first lens is one of a concave surface and a flat surface;
a second lens having refractive power, an overall optical effect of the first lens and the second lens is negative refractive power;
a third lens having positive refractive power, an Abbe number of the third lens is V3;
a fourth lens having positive refractive power; and
a fifth lens having negative refractive power, an Abbe number of the fifth lens is V5, the optical lens satisfies V5>V3, a distance from the object-side surface of the first lens to an imaging plane is TTL, a focal length of the optical lens is f, an image height of the optical lens is Y', a field of view of the optical lens is FOV, an aperture of the optical lens is Fno, the optical lens satisfies 2≤TTL/f≤4, and further satisfies at least one of the following conditions: 0.5≤f/Y'≤1.5, 90°≤FOV≤180° and 0<(Fno×TTL)/(FOV×Y')≤0.3.

2. The optical lens according to claim 1, wherein a radius of curvature of an object-side surface of the fourth lens is R7, a radius of curvature of an image-side surface of the fourth lens is R8, a radius of curvature of an object-side surface of the fifth lens is R9, a radius of curvature of an image-side surface of the fifth lens is R10, and the optical lens satisfies at least one of the following conditions: 1≤|(R7−R8)/(R7+R8)|≤2 and 0≤|(R9−R10)/(R9+R10)|≤1.

3. The optical lens according to claim 1, wherein a refractive index of the first lens is N1 and an Abbe number of the first lens is V1, a refractive index of the second lens is N2 and an Abbe number of the second lens is V2, a refractive index of the third lens is N3, a refractive index of the fourth lens is N4 and an Abbe number of the fourth lens is V4, a refractive index of the fifth lens is N5, and the optical lens satisfies at least one of the following conditions: N3>N1, N1>N2, N1>N4, N1>N5, V1>V3, V2>V3 and V4>V3.

4. The optical lens according to claim 1, wherein the optical lens satisfies at least one of the following conditions: the first lens is a biconcave lens or a flat-convex lens, the third lens is a concave-convex lens, and the fourth lens is a biconvex lens.

5. The optical lens according to claim 1, wherein the optical lens satisfies at least one of the following conditions: slopes of tangents of an object-side surface of the second lens from a center point of the object-side surface of the second lens in a first direction away from an optical axis of the optical lens are positive, and slopes of tangents of an image-side surface of the second lens from a center point of the image-side surface of the second lens in the first direction away from the optical axis are positive.

* * * * *